United States Patent [19]

Lemberger

[11] Patent Number: 5,360,259
[45] Date of Patent: Nov. 1, 1994

[54] CONTAINING AND DUMPING APPARATUS

[76] Inventor: Donald A. Lemberger, 4215 Sweet Gum Dr., St. Louis, Mo. 63125

[21] Appl. No.: 100,485

[22] Filed: Jul. 30, 1993

[51] Int. Cl.$^5$ .............................................. B60P 01/04
[52] U.S. Cl. .................................. 298/19 V; 224/280; 224/282; 298/1 C
[58] Field of Search ...................... 224/42.32, 280, 282; 298/1 C, 19 V

[56] References Cited

U.S. PATENT DOCUMENTS 3,584,749  6/1971  Parello .............................. 298/1 CX

FOREIGN PATENT DOCUMENTS 708014  4/1954  United Kingdom ................ 298/1 C

*Primary Examiner*—Michael S. Huppert
*Assistant Examiner*—Janice Krizek
*Attorney, Agent, or Firm*—Senniger, Powers, Leavitt & Roedel

[57] ABSTRACT

Containing and dumping apparatus for releasable connection to a motorized utility vehicle having forward and rearward ends and a rack secured generally at one of the ends. The rack has a generally horizontal rail extending transversely relative to the vehicle. The apparatus comprises a bin and a connector for releasably and pivotably connecting the bin to the rack for movement of the bin about a generally horizontal axis between a cargo holding position in which the top of the bin faces generally upward for receiving a load of cargo and holding the load as it is transported by the vehicle, and a dumping position in which the top of the bin faces generally rearwardly relative to the vehicle for dumping the load from the bin.

14 Claims, 3 Drawing Sheets

CONTAINING AND DUMPING APPARATUS

BACKGROUND OF THE INVENTION

This invention relates generally to apparatus for selectively containing and dumping cargo and, more particularly, to containing and dumping apparatus for releasable connection to motorized utility vehicles.

Motorized utility vehicles, such as All Terrain Vehicles ("ATVs"), are versatile vehicles which may be used for recreational purposes or for utilitarian purposes, such as pulling or pushing light wheeled equipment. ATVs typically have racks at their front and rear ends. Users may fasten goods or supplies to the racks for transportation to a desired location where they are then unfastened and removed from the rack. The fastening and unfastening procedures are often time consuming. Also, the types of goods or supplies which can be fastened to the racks are limited. For example, loose material, such as dirt, gravel, grain, etc., cannot be fastened to the rack unless it is first bagged or otherwise contained. Of course, bagging such material is labor intensive and time consuming.

SUMMARY OF THE INVENTION

Among the several objects of this invention may be noted the provision of apparatus releasably attachable to a rack of a motorized utility vehicle for holding cargo without the need to fasten the cargo to the rack; the provision of such apparatus capable of holding loose material, making bagging of the material unnecessary; the provision of such apparatus adapted to selectively hold and dump the material; the provision of such apparatus which may be quickly and easily attached to and detached from the rack; the provision of such apparatus which is of durable and lightweight construction; and the provision of such apparatus which is economical to manufacture.

Generally, containing and dumping apparatus of the present invention is adapted for releasable connection to a motorized utility vehicle having forward and rearward ends and a rack secured generally at one of the ends. The rack has a generally horizontal rail extending transversely relative to the vehicle. The apparatus comprises a bin and means for releasably and pivotably connecting the bin to the rack for movement of the bin about a generally horizontal axis between a cargo holding position in which the top of the bin faces generally upward for receiving a load of cargo and holding the load as it is transported by the vehicle, and a dumping position in which the top of the bin faces generally rearwardly relative to the vehicle for dumping the load from the bin.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
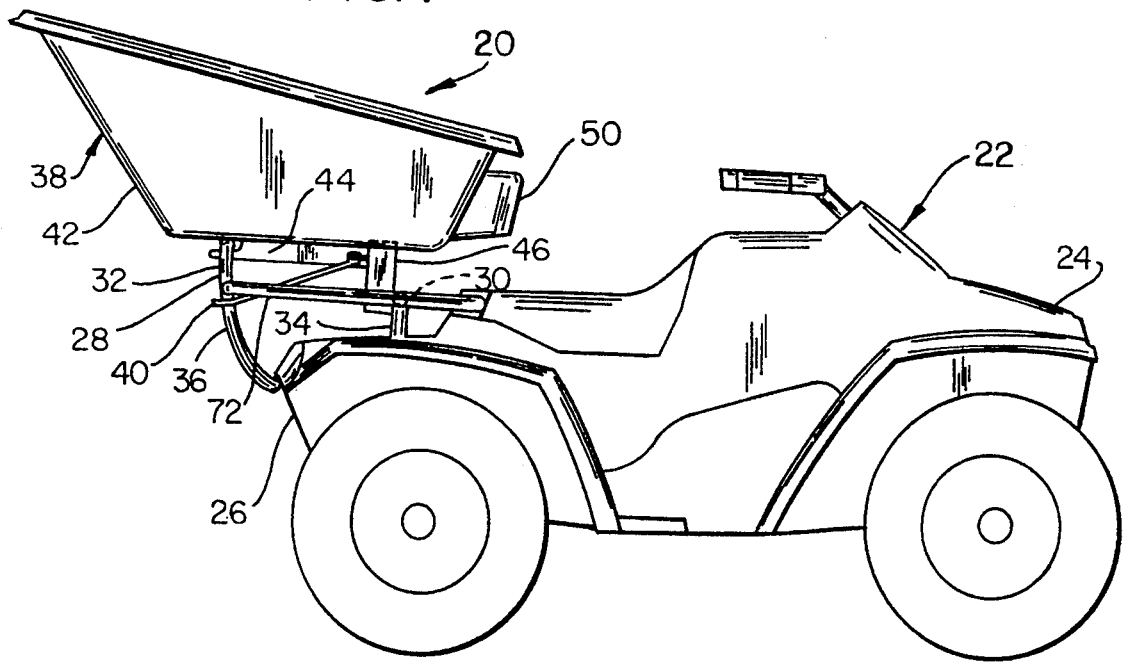
FIG. 1 is a side elevational view of containing and dumping apparatus of the present invention connected to a rack of an ATV.

Referring now to the drawings, and first more particularly to FIG. 1, containing and dumping apparatus of the present invention is indicated in its entirety by the reference numeral 20. The apparatus 20 is adapted for releasable connection to a small motorized utility vehicle, such as an ATV, generally designated 22, The ATV 22 has forward and rearward ends 24, 26 and a metal rack 28 secured generally at the rearward end. Although not shown, many ATVs also have racks secured generally at their forward ends. The rack 28 has a platform 30 formed of a plurality of longitudinal and transverse bars, and a rear rail 32 connected to the rear end of the platform 30. The rail 32 is generally horizontal and spaced above the plane of the platform spaced generally above the plane of the platform 30. It extends transversely relative to the ATV 22 generally from one side of the rack 28 to the other. Mounting bars extend generally downward from the platform 30 to secure the rack 28 to the ATV 22.

Figure 2:
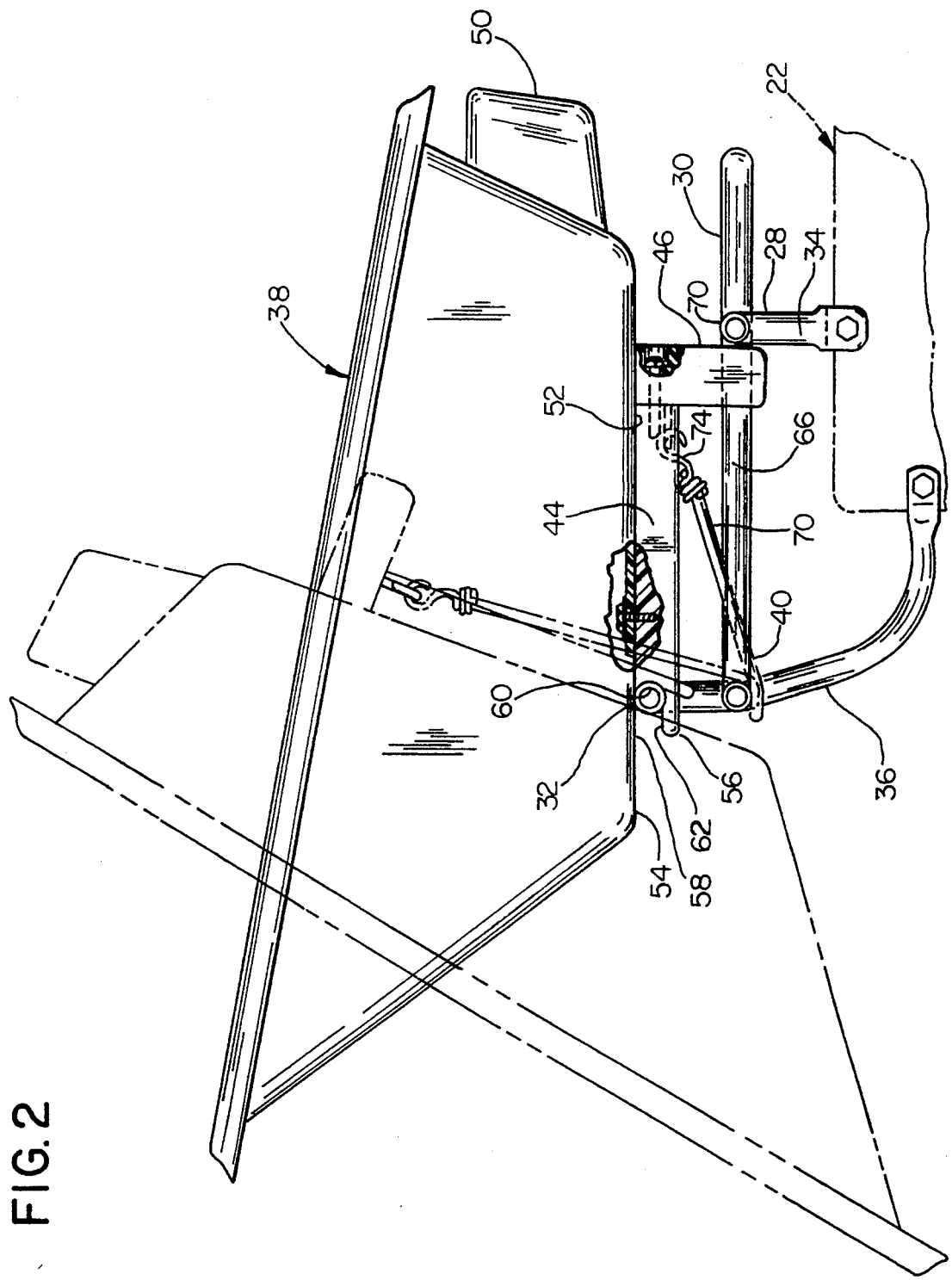
FIG. 2 is an enlarged side elevational view of the apparatus and rack of FIG. 1.

The apparatus 20 comprises a bin, generally designated 38, and a resilient strap (bungee) 40 for connecting the bin 38 to the rack 28. The bin 38 includes an open-top bowl 42, a pair of struts 44 fixed to and traversing the underside of the bowl, and a pair of foot members 46 secured to the underside of the bowl and engageable with the platform 30 for spacing the underside of the bowl from the platform 30. The struts 44 and foot members 46 are fastened to the underside of the bowl 42 by a plurality of screws 48. Preferably, the bowl 42, struts 44, and foot members 46 are made of a generally rigid, lightweight, durable material such as a suitable polymeric resinous material. Also, the bowl 42 is preferably of a similar type and size as bowls commonly used in wheelbarrows. A yieldable pad 50 extends forward from a forward end of the bowl 42. The pad 50 acts as a backrest against which a user driving the ATV may lean. The struts 44 extend from a bowl forward portion 52 to a bowl rearward portion 54 (from right to left as shown in FIG. 2). Each strut 44 has a protrusion 56 at its rearward end extending rearwardly and spaced from the underside of the bowl 42. The protrusions 56 and the underside of the bowl 42 define slots 58 having closed inner ends 60 and open outer ends 62. The slots 58 are dimensioned for receiving the rear rail 32 of the ATV rack 28. The protrusions 56 and slots 58 constitute connectors for pivotably connecting the bin 38 to the rail 32 for movement of the bin about a horizontal axis X between a cargo holding position (shown in solid in FIG. 2) and a dumping position (shown in phantom in FIG. 2). In the cargo holding position the top of the bowl 42 faces generally upward for receiving a load of cargo (not shown) and holding the load as it is transported by the ATV 22. In the dumping position, the top of the bowl 42 faces generally rearwardly relative to the ATV for dumping the load from the bowl. Preferably, the height of each slot 58 (i.e., the distance between the protrusion 56 and underside of the bowl 42) is only slightly greater than the diameter of the rear rail 32 to minimize play of the rail 32 within the slot 58. The protrusions 56 engage the rail 32 in the slots 58 to hold the bin 38 on the ATV rack 28 as the bin is pivoted on the rail 32 from its cargo holding position to its dumping position.

Figure 3:
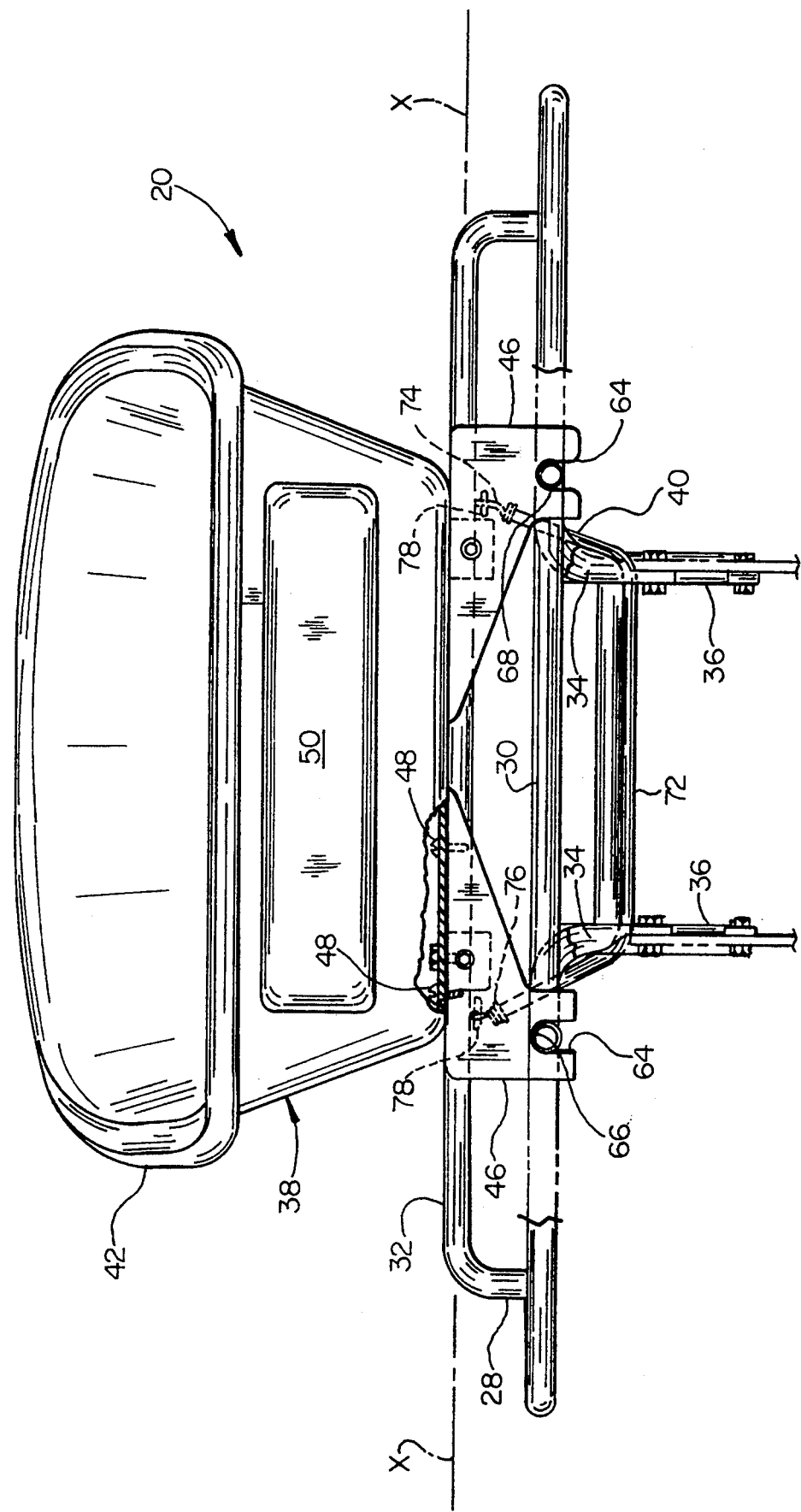
FIG. 3 is a front elevational view of the apparatus and rack of FIG. 2.

As shown in FIGS. 2 and 3, the foot members 46 project downward from the underside of the bowl 42. Each foot member 46 has a recess 64 therein (see FIG. 3) adapted to receive a longitudinal rail 66 or 68 of the rack platform 30. When the bin 38 is in its cargo holding position, the longitudinal rails 66, 68 are positioned within the recesses 64 to prevent or limit lateral movement of the bin 38 relative to the rack 28. As shown in FIG. 2, when the bin 38 is in its cargo holding position, the foot members 46 are slightly rearward of and in contact with transverse rails 70, 71 of the rack platform 30 and the closed inner end 60 of the slot 58 is slightly forward of and in contact with the rear rail 32. Engagement of the foot members 46 with rails 70, 71 prevents forward movement of the bin 38 relative to the rack 28 and engagement of the inner end 60 of the slot 58 with rear rail 32 prevents rearward movement of the bin relative to the rack.

Although the slot 58 has been described as being defined by the strut protrusion 56 and the underside of the bowl 42, it is to be understood that the slot could be formed entirely by a recess in the strut or by a recess in the bowl without departing from the scope of this invention. It is also to be understood that the bowl, struts, and foot members could all be formed as a single unitary member, rather than being separate pieces secured together.

Figure 4:
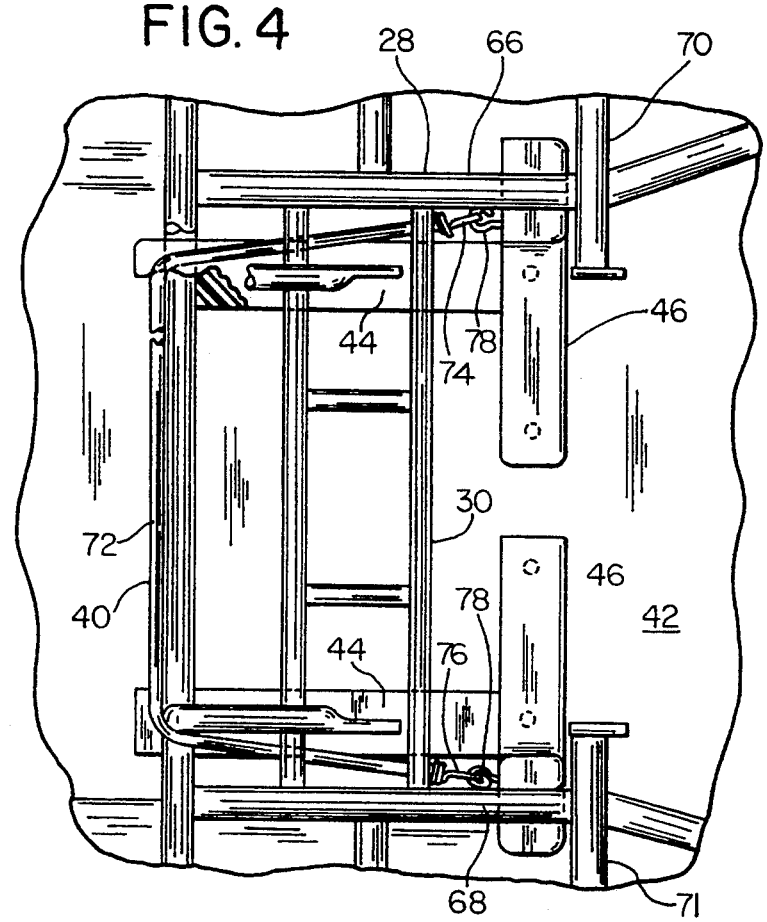
FIG. 4 is a partial bottom plan view of the apparatus and rack of FIG. 2.

The bungee 40 comprises an elasticized cord 72 and first and second bungee hooks 74, 76 secured to opposite ends of the cord. The bungee hooks 74, 76 are engageable with eye hooks 78 mounted to the foot members 46. As shown in FIGS. 2 and 4, when the bungee 40 connects the bin 38 to the ATV rack 28, the bungee hooks 74, 76 are fastened to the eye hooks 78 and the cord 72 is stretched around a rearward portion of the rack 28. Thus, the bungee 40 is secured generally at is ends to the bin 38 and captures the rack 28 generally intermediate the ends of the cord 72. The bungee 40 is sized to be in tension when it engages the rack 28 and bin 32, regardless of whether the bin is in the cargo holding position or the dumping position. As shown in FIG. 2, since the bungee 40 is in tension and since it extends generally from the foot members 46 rearwardly and downwardly to the rack 28, it urges the bin 38 rearwardly and downwardly relative to the rack, and therefore urges the inner ends 60 of the slots 58 toward the rear rail 32. Thus, the bungee 40 constitutes means for retaining the rear rail 32 within the slot 58. Also, because the bungee hooks 74, 76 are connected to the foot member 46, the tensioned cord 72 tends to pull the foot members 46 downward toward the rack 28 and, consequently biases the bin 38 toward its cargo holding position. Although the cord 72 is in tension when the bin 38 is in its cargo holding position, the tension increases as the bin 38 is pivoted to its dumping position, since the cord 72 is elongated as the bin 38 is so pivoted. The biasing force may be increased or decreased by selecting a bungee having a shorter or longer cord or by selecting a bungee having a larger or smaller modulus of elasticity. Also, although the bungee 40 has been described with both of its hooks 74, 76 fastened to the bin 38 and the cord 72 stretched around the rack 28, it is to be understood that the bungee could alternatively connect the bin to the rack by having one hook fastened to the bin and the other hook fastened to the rack.

To connect the apparatus 20 to the ATV rack 28, the bin 38 is placed on the rack 28 and slid rearwardly to engage the rear rail 32 in the slots 58, and the foot members 46 engage the longitudinal rails 66, 68 of the rack platform 30. The first bungee hook 74 is then connected to one of the eye hooks 78, the bungee cord 72 is stretched around a rear portion of the rack 28, and the second bungee hook 76 is connected to the other eye hook 78. The tension of the cord 72 retains the rail 32 in the slot 58 and biases the bin 38 in the cargo holding position, and the engagement of the longitudinal rails 66, 68 of the platform 30 in the recesses 64 of the foot members 46 limits lateral movement of the bin 38 relative to the rack 28. To remove the bin 38, the bungee 40 is detached from the eye hooks 78, the bin is pivoted rearwardly (counterclockwise in FIG. 2) to disengage the foot members 46 from the platform 30, and the bin is lifted to slide the slots 58 out of engagement with the rear rail 32. Thus, the apparatus 20 may be quickly and easily connected to or disconnected from the ATV rack 28 without the use of any tools.

In use, with the apparatus 20 connected to the rack 28 and with the bin 38 in its cargo holding position, a load of cargo is placed in the bowl 42 and transported, via the ATV, to its destination. The user than lifts up on the forward end of the bowl 42 or pushes down on the rearward end of the bowl to pivot the bin 38 rearwardly (counterclockwise in FIG. 2) on axis X to its dumping position so that the load falls from the bowl. Thus, cargo may be easily loaded on and unloaded from the ATV.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. Containing and dumping apparatus adapted for releasable connection to a motorized utility vehicle having forward and rearward ends and a rack secured generally at one of said ends, said rack having a generally horizontal rail extending transversely relative to the vehicle, said apparatus comprising a bin and means for releasably and pivotably connecting said bin to said rack for movement of the bin about a generally horizontal axis between a cargo holding position in which the top of the bin faces generally upward for receiving a load of cargo and holding the load as it is transported by the vehicle, and a dumping position in which the top of the bin faces generally rearwardly relative to the vehicle for dumping the load from the bin, the connecting means comprising at least one protrusion extending from the underside of the bin at least partially defining a slot for receiving the rail, said protrusion engaging the rail in the slot to hold the bin on the rack as the bin is pivoted on the rail from its cargo holding position to its dumping position, the slot having an open outer end and a closed inner end, the connecting means further comprising means for urging the inner end of the slot toward the rail to retain the rail within the slot.

2. Apparatus as set forth in claim 1 wherein said urging means comprises a resilient strap having a first portion engageable with the rack and a second portion engageable with the bin, said strap being in tension when the strap engages the rack and bin.

3. Apparatus as set forth in claim 2 wherein the strap is secured generally at its ends to the bin and captures the rack generally intermediate the ends of the strap.

4. Apparatus as set forth in claim 2 wherein said strap engages the bin and rack in a manner for biasing the bin toward its cargo holding position.

5. Apparatus as set forth in claim 4 wherein the tension of the strap increases as the bin is pivoted from its cargo holding position to its dump position.

6. Apparatus as set forth in claim 2 wherein said strap comprises a bungee having an elasticized cord and a pair of hooks secured to opposite ends of the cord.

7. Apparatus as set forth in claim 1 wherein said bin comprises a bowl and at least one strut secured to the underside of said bowl, said strut extending generally from a forward portion of the bowl to a rearward portion of the bowl, said protrusion comprising a rear portion of the strut spaced from and located generally below the bowl when the bin is in its cargo holding position, said slot comprising the space between the bowl and the rear portion of the strut.

8. Apparatus as set forth in claim 1 further comprising means for limiting lateral movement of the bin relative to the rack when the bin is in its cargo holding position.

9. Containing and dumping apparatus adapted for releasable connection to a motorized utility vehicle having forward and rearward ends and a rack secured generally at the rearward end, said rack having a generally horizontal rail extending transversely relative to the vehicle, said apparatus comprising:

a bin adapted for being mounting on the rack, said bin having a bowl and at least one strut secured to the underside of said bowl, said strut extending generally from a forward portion of the bowl to a rearward portion of the bowl, said strut having a rearward end portion constituting, at least in part, a connector for pivotably connecting the bin to the rail for movement of the bin about a horizontal axis between a cargo holding position in which the top of the bin faces generally upward for receiving a load of cargo and holding the load as it is transported by the vehicle, and a dumping position in which the top of the bin faces generally rearwardly relative to the vehicle for dumping the load from the bin; and a resilient strap having a first portion engageable with the rack and a second portion engageable with the bin, said strap being in tension when the strap engages the rack and bin for urging the connector against the rail.

10. Apparatus as set forth in claim 9 wherein the connector includes a slot dimensioned for slidably and releasably receiving the rail when the bin is mounted on the rack.

11. Apparatus as set forth in claim 10 wherein said slot includes an open outer end and a closed inner end, said strap urging the inner end of said slot toward the rail when the strap engages the rack and bin.

12. Apparatus as set forth in claim 9 wherein the strap is secured generally at its ends to the bin and captures the rack generally intermediate the ends of the strap.

13. Apparatus as set forth in claim 9 further comprising means for limiting lateral movement of the bin relative to the rack when the bin is in its cargo holding position.

14. Apparatus as set forth in claim 13 wherein said limiting means comprises a member secured adjacent the underside of said bowl having at least one recess therein, said recess adapted to engage a portion of said rack to limit lateral movement of the bowl relative to the rack.

* * * * *